United States Patent [19]

Smith et al.

[11] Patent Number: 4,795,050
[45] Date of Patent: Jan. 3, 1989

[54] TWO-STAGE FUEL CAP

[75] Inventors: Dwight Smith; Robert S. Harris, both of Connersville, Ind.

[73] Assignee: Stant Inc., Connersville, Ind.

[21] Appl. No.: 2,214

[22] Filed: Jan. 12, 1987

Related U.S. Application Data

[63] Continuation-in-part of Ser. No. 846,081, Mar. 31, 1986.

[51] Int. Cl.[4] .................. B65D 6/12; B65D 51/16; B01D 53/02
[52] U.S. Cl. .................. 220/85 VR; 220/86 R; 220/202; 220/DIG. 33
[58] Field of Search .................. 220/85 VR, DIG. 33, 220/86 R, DIG. 22, 202, 210

[56] References Cited

U.S. PATENT DOCUMENTS

| | | | |
|---|---|---|---|
| 3,298,711 | 12/1966 | Hall | 141/286 |
| 3,543,484 | 12/1970 | Davis | 55/387 |
| 3,643,690 | 2/1972 | Sarai | 137/587 |
| 3,752,135 | 8/1973 | Peterson et al. | 123/136 |
| 3,763,901 | 10/1973 | Viland | 141/8 |
| 3,854,911 | 12/1974 | Walker | 55/387 |
| 3,884,204 | 5/1975 | Krautwurst et al. | 123/136 |
| 3,907,010 | 9/1975 | Burtis et al. | 141/45 |
| 3,907,153 | 9/1975 | Mutty | 220/86 |
| 3,921,412 | 11/1975 | Heath et al. | 62/54 |
| 4,142,647 | 3/1979 | Walters | 220/85.8 |
| 4,384,962 | 5/1983 | Harris | 210/788 |
| 4,390,107 | 6/1983 | Hukuta | 220/210 |
| 4,420,392 | 12/1983 | Harris | 210/86 |
| 4,497,714 | 2/1985 | Harris | 210/788 |
| 4,610,284 | 9/1986 | Bartholomew | 141/302 |
| 4,630,749 | 12/1986 | Armstrong et al. | 220/86 |
| 4,651,889 | 3/1987 | Uranishi et al. | 220/85 |
| 4,678,097 | 7/1987 | Crute | 220/DIG. 33 |
| 4,699,638 | 10/1987 | Harris | 220/85 VR |
| 4,707,164 | 11/1987 | Harris | 220/85 VR |
| 4,747,508 | 5/1988 | Sherwood | 220/86 R |

FOREIGN PATENT DOCUMENTS 3146824 6/1983 Fed. Rep. of Germany ... 220/DIG. 33

Primary Examiner—Willis Little
Attorney, Agent, or Firm—Barnes & Thornburg

[57] ABSTRACT

A system is provided for activating a sensor during an initial stage of a vehicle refueling activity. The system includes a fuel tank filler neck having a mouth and a fuel cap having a closure rotatably engaging the filler neck for closing the mouth. A sensor is positioned in close proximity to the filler neck. The fuel cap further includes a seal between the closure and the filler neck, an outer shell providing a hand grip, a hub, and an actuator member movable between an inactive position and a sensor-activating position. The hub interconnects the closure and the outer shell for applying a torque to the closure after a predetermined amount of movement of the shell relative to the filler neck so that a lost motion connection is established between the closure and the shell. The lost motion of the hub acts to move the actuator member to its sensor-activating position before rotating the closure relative to the filler neck in an amount sufficient to break the seal. Thus, fuel vapors in the filler neck are unable to escape therefrom through the mouth until at least the sensor has been activated.

22 Claims, 4 Drawing Sheets

TWO-STAGE FUEL CAP

This is a continuation-in-part of co-pending U.S. patent application Ser. No. 06/846,081, filed Mar. 31, 1986, entitled "Fuel Vapor Recovery System" and assigned to the same assignee as the present application.

BACKGROUND AND SUMMARY OF THE INVENTION

This invention relates to vehicle emissions control, and particularly to fuel caps for filler necks. More particularly, this invention relates to a fuel cap that is movable in relation to the filler neck to activate an external sensor positioned adjacent to the filler neck without breaking a fuel vapor seal established between the fuel cap and the filler neck.

Polluting emissions are released into the atmosphere during each and every motor vehicle refueling activity. Typically, removal of a fuel cap permits pressurized fuel vapors present within the vehicle fuel system to escape to the atmosphere. In view of the frequency of vehicle refueling activities, it will be appreciated that a significant quantity of otherwise combustible fuel is lost to the atmosphere each time a vehicle is refueled.

New fuel vapors are generated during refueling due to splash and agitation of the dispensed fuel, as well as from potential temperature differences between the fuel tank and the dispensed fuel. In addition, as the liquid fuel dispensed at the pump fills the vehicle fuel tank, fuel vapors that are present in the tank and generated during refueling are displaced by liquid fuel. These displaced fuel vapors are moved out of the fuel tank vapor space by the displacing action of the liquid fuel. In conventional vehicle fuel systems, these displaced vapors are released directly into the atmosphere via the fuel tank filler neck and are a contributing factor to air pollution.

One object of the present invention is to provide an emissions control system for advantageously capturing fuel vapors normally discharged during a vehicle refueling activity so as to reduce waste of fuel energy resources, assist in reducing the level of air pollution, and avoid the shortcomings of conventional vehicle fuel systems.

Another object of the present invention is to provide a fuel vapor recovery system that conforms to all government environmental and safety regulations regarding evaporative and refueling emissions, exhaust emissions, and vehicle impact, and that also satisfies customer-perceived vehicle functions such as drivability, ease of refueling, and control of fuel vapor odor.

Yet another object of the present invention is to provide a two-stage fuel cap for actuating a fuel vapor recovery system in a vehicle during an initial stage of each vehicle refueling activity.

Another object of the present invention is to provide a fuel cap that establishes a seal with the filler neck to prevent escape of fuel vapors from the closed filler neck and also activates an adjacent sensor without breaking the fuel vapor seal in response to movement of the fuel cap in relation to the filler neck. Thus, fuel vapors in the sealed filler neck can be vented to a remote fuel vapor treatment site by activiation of the sensor before any fuel vapor is permitted to escape past the seal from the filler neck into the atmosphere.

It will be understood that such a sensor can function in a variety of ways to achieve different results. For example, the sensor could be coupled to a display light or other signal means to indicate removal and/or replacement of the fuel can the filler neck. In addition, the sensor could be coupled to a vehicle-based or a fuel pump-based fuel vapor recovery system so that activation of the sensor initiates a fuel vapor recovery sequence. It will be appreciated by those skilled in the art that such a sensor could function to activate or disable a variety of automotive or non-automotive systems, and, as such, is not limited only to the vapor recovery system function described in connection with preferred embodiments of the present invention.

Another object of the present invention is to provide a fuel cap that activiates an adjacent sensor during a first stage of fuel cap movement relative to the filler neck.

Yet another object of the present invention is to provide a fuel cap that has a n actuator member that is movable to activate an adjacent sensor upon rotation of the fuel cap during an initial stage of a vehicle fueling activity without prematurely breaking the fuel vapor seal established between the fuel cap and the filler neck.

Still another object of the present invention is to provide a fuel cap that is rotatable through two sequential stages during removal of the cap from the filler neck at the beginning of a vehicle refueling activity to control, in sequence, venting of fuel vapor from the filler neck and opening of the filler neck to the atmosphere. In the first stage, the fuel cap is rotated to activate a fuel vapor vent-opening sensor included in a fuel vapor recovery system. In the second stage, the fuel cap is rotated further to break the fuel vapor seal established between the fuel cap and the filler neck after substantially all of tee fuel vapors in the filler neck have been vented to a treatment site for recovery.

In accordance with the present invention, a system is provided for activating a sensor positioned in close proximity to a fuel tank filler neck during an initial stage of a vehicle refueling activity. The system includes a fuel tank filler neck having a mouth add a fuel cap.

The fuel cap includes closure means rotatably engaging the filler neck for closing the mouth, seal means for providing a fuel vapor seal between the closure means and the filler neck, shell means for providing a hand grip, hub means interconnecting the closure means and shell means for applying a torque to the closure means after a predetermined amount of movement of the shell means relative to the filler neck so that a lost motion connection is established between the closure means and the shell means, and an actuator member that is movable between an inactive position and a sensor-activating position.

The lost motion of the hub means acts to move the actuator member from its inactive position to its sensor-activating position before rotating the closure means a sufficient amount relative to the filler neck to break the seal provided by the seal means. One feature of this system is that such movement of the actuator member is accomplished by manually rotating the shell means relative to the filler neck without breaking the fuel vapor seal provided by the seal means. Advantageously, fuel vapors in the filler neck are unable to escape past the fuel vapor seal to the atmosphere through the filler neck mouth until at least the sensor has been activated by the actuator member.

In preferred embodiments of the present invention, the sensor is a ring positioned to surround the filler neck in close proximity to the mouth. The sensor ring is yieldably biased in an axially-outward direction relative to the filler neck from a disabled position toward an actuated position by one or more loading springs. In addition, the actuator member is coupled to an outer rim of the shell means for movement therewith.

In its inactive position, the actuator member engages the spring-biased sensor to compress the loading springs and hold the sensor in its disabled position. However, as the actuator member approaches its sensor-activating position, it moves in an axially-outward direction relative to the filler neck to release the sensor. Such movement permits the loading springs to urge the sensor in an axially-outward direction to actuate a system coupled to the sensor such as a fuel vapor recovery system. Thus, when the fuel cap sealingly engages the filler neck, the actuator member is normally positioned to prevent axially-outward movement of the spring-loaded sensor toward a system-actuating position.

The lost motion means includes a hub threadedly receivable in the closure means. During the first stage, the hub is rotatable inside the closure means from an axially-inner position to an axially-outer position to lift the shell means away from the mouth of the filler neck, thereby moving the attached actuator member from its axially-inner inactive position to its axially-outer sensor-activating position. Importantly, rotation of the hub inside the closure means does not cause the closure means to rotate relative to the filler neck a sufficient amount to break the fuel vapor seal established therebetween during this first stage.

The closure means includes an exterior flange that extends in a radially-outward direction to trap a resilient O-ring seal against an annular lip defining the mouth of the filler neck. The closure means further includes an annular side wall surrounding the hub. The hub includes a radially outwardly-extending drive lug. A window is formed in the annular side wall of the closure means to receive the drive lug of the hub. The window is much larger than the drive lug to permit a certain amount of movement of the drive lug in the window during rotation of the hub inside the closure means before engagement of the drive lug with a boundary rim of the window.

In operation, the hub rotates relative to the closure means in response to manual rotation of the shell means due to a lost motion connection established as a result of movement of the drive lug in the window. The hub and shell means cooperate to move the actuator member to its sensor-activating position during this first stage prior to any rotation of the closure means. This lost motion connection advantageously acts to delay breaking the seal established between the closure means and the filler neck until after the actuator member has been moved to its sensor-activating position. Once the drive lug engages the boundary rim of the window, a driving connection between the hub and the closure means is established to replace the lost motion connection. Thereafter, during a second stage, rotation of the hub causes the closure means to rotate toward a removal position. Thus, the actuator member has already been moved to activate an adjacent sensor before the second stage has begun.

The two-stage actuation system of the present invention is thought to have considerable utility in many capping environments and should not be limited only to inclusion in a fuel cap for closing a fuel tank filler neck. It is expected that the invention is installable in caps generally to provide two-stage means for sequentially activating separate first and second sensors or systems of many different types.

Additional objects, features, and advantages of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
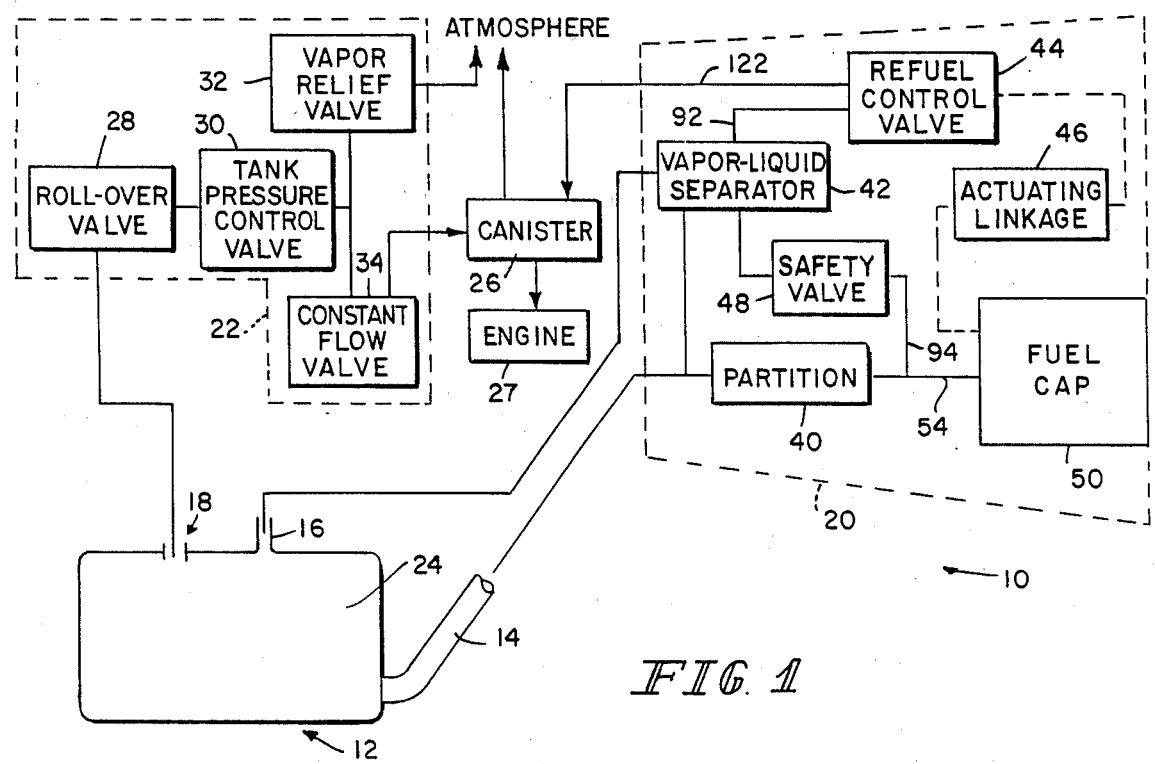
FIG. 1 is a block diagram of a system for recovering vapors during a vehicle refueling activity in accordance with the present invention.

Referring to FIG. 1, one preferred embodiment of a vapor recovery system 10 includes a fuel tank 12 having a filler neck 14, a fill-limiting vent tube 16, and a vent valve opening 18, a vapor recovery module 20, and a roll-over valve module 22. The vapor recovery module 20 is automatically actuated in the manner explained below to conduct substantially all fuel vapors that are present in the vapor space 24 of the fuel tank 12, displaced by liquid fuel during refueling, and generated during refueling, to a fuel vapor treatment site 26 for environmental treatment therein. Preferably, a conventional charcoal canister or other vapor condenser is provided at treatment site 26 to adsorb liquid fuel entrained in the recovered fuel vapors onto a substrate to permit recombustion in vehicle engine 27 at a later time.

In the embodiment of FIG. 1, the roll-over valve module 22 includes a roll-over valve 28, a tank-pressure control valve 30, a vapor-relief valve 32, and a constant flow valve 34. The roll-over valve module 22 is preferably mounted in a wall of the fuel tank 22 at vent valve opening 18. The roll-over valve module 22 serves a dual purpose by selectively releasing fuel vapors from the vapor space 24 to either the canister 26 or the atmosphere so as to regulate flow of fuel vapors to the canister 26, and by automatically closing the vent valve opening 18 during a vehicle rollover accident so as to guard against hazardous fuel leakage. Reference is hereby made to a U.S. patent application Ser. No. 06/837,152, filed Mar. 7, 1986 and assigned to the same assignee as the present invention, for a complete disclosure of a roll-over valve assembly suitable for use in the vapor recovery system 10.

As shown in block diagram form in FIG. 1, the vapor recovery module 20 includes a partition 40 in the filler neck 14, a vapor-liquid separator 42, a refuel control valve 44, an actuating linkage 46, a safety valve 48, and a fuel cap 50. Illustratively, the actuating linkage 46 provides means for sensing whenever the fuel cap 50 is loosened a sufficient amount during an initial stage of each refueling activity. The actuating linkage 46 also provides means for actuating the refuel control valve 44 in response to the sensing means. Actuation of refuel control valve 44 permits fuel vapors present in the vapor space 24, and otherwise associated with refueling, to be conducted to the canister 26 via a vapor flow path in the vapor recovery module 20 instead of allowing such environmentally damaging vapor to escape untreated to the atmosphere through filler neck outlet 54. FIGS. 3-6 illustrate one preferred arrangement of the components illustrated in block diagram form in FIG. 1.

Figure 6:
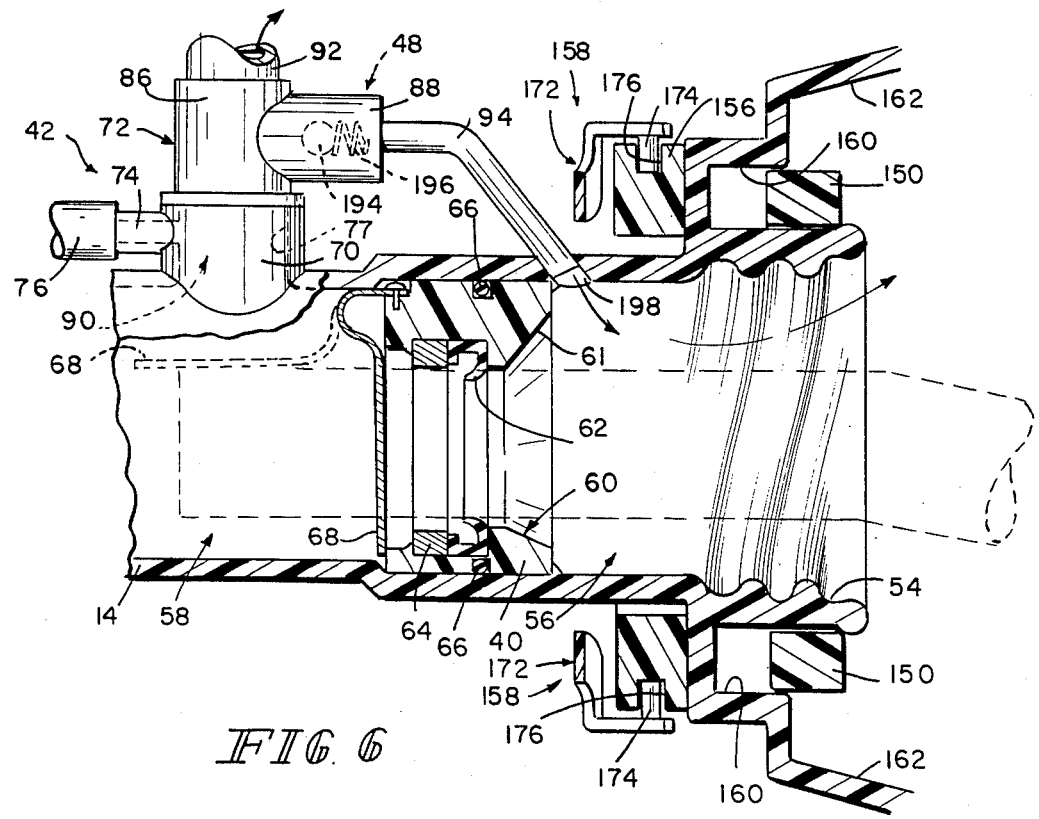
FIG. 6 is a longitudinal sectional view taken along lines 6—6 of FIG. 3 showing a fuel-dispensing nozzle in phantom lines inserted into the fuel tank filler neck during refueling.

Referring primarily to FIGS. 1 and 6, partition 40 is staked in place in the filler neck 14 in proximity to the filler neck mouth 54 to separate filler neck 14 into an outer chamber 56 and an inner chamber 58. The outer chamber 56 is communicable with the atmosphere via filler neck mouth 54 whenever the fuel cap 50 is removed. The inner chamber 58 is always in fluid communication with the fuel tank 12 via the filler neck 14. Advantageously, partition 40 provides a vapor tight inner chamber 58 so as to prevent escape of untreated fuel vapors to the atmosphere during refueling.

At service, partition 40 may be easily detached for repair or disposal. As shown in FIG. 6, the inner diameter of outer chamber 56 is stepped to permit removal of the partition 40 therethrough. One advantage of the present invention is that partition 40 is replaceable as a unit for service through the outer chamber 56 and filler neck mouth 54 without disassembly of the vapor recovery module 20 from its installed position in a vehicle. After service, a repaired or replacement partition may be staked into a proper position within filler neck 14.

Partition 40 includes a nozzle size-restricting passageway 60 for admitting a pump nozzle (represented by broken lines in FIG. 6) into the inner chamber 58. An annular nozzle seal 62 sealingly embraces the pump nozzle during pumping as shown in FIG. 6. Annular nozzle seal 62 is held in sealing position in the passageway 60 by retainer 64 so that fuel can be dispensed into the inner chamber 58 without coupling the inner and outer chambers 58, 56 in fluid communication during refueling. Hard nozzle pilot surface 61 is provided in passageway 60 to protect seal 62 from damage during refueling. An O-ring seal 66 is situated in a recess formed in an exterior wall of partition 40 to engage an interior wall of passageway 60 in sealing relation. Leaded fuel splash door 68 is pivotally mounted or otherwise deflectable in relation to an inner end of partition 40 in a customary way to splash leaded fuel dispensed using an ordinary pump nozzle back toward a user.

Vapor-liquid separator 42 is used for separating liquid fuel entrained in fuel vapor discharged from fuel tank 12 via a fill-limiting tube 16 and/or a filler neck 14 to reduce the mass of fuel entrained in such discharged vapor prior to introducing the vapor into canister 26. As shown best in FIG. 3, the separator 42 includes a hollow base 70 fixed to an exterior surface of filler neck 14 and a top cover assembly 72.

Figure 3:
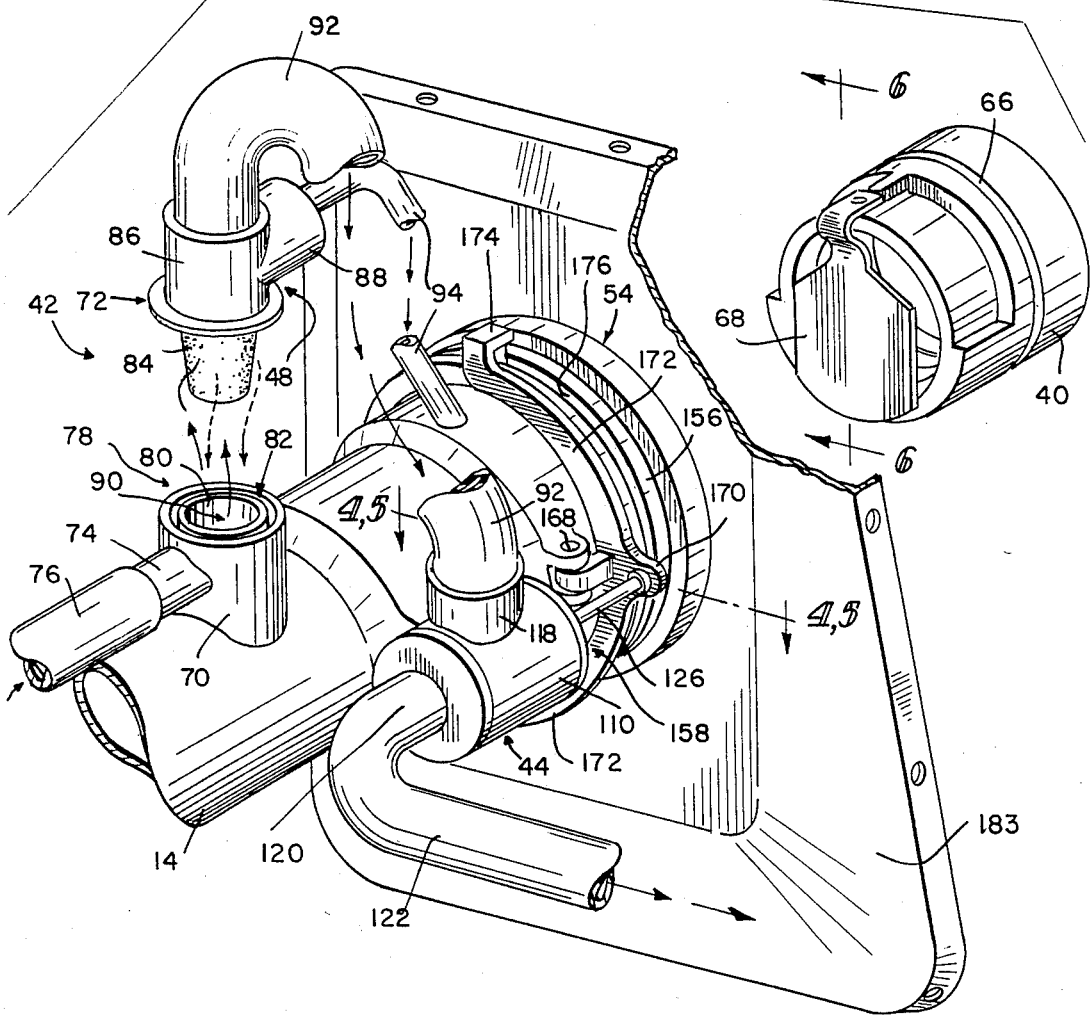
FIG. 3 is an exploded perspective view of a preferred embodiment of a vapor recovery module in accordance with the present invention with portions broken away.

Referring to FIGS. 3 and 6, base 70 includes an inlet 74 in fluid communication with the fill-limiting vent tube 16 via pipe 76, a liquid fuel outlet 77, and an upper opening 78 coverable by top cover assembly 72. Annular shield 80 is installed in the chamber provided by hollow base 70 in spaced relation to define an annular swirl passage 82 therebetween. The top cover assembly 72 includes a discriminator screen 84, a fuel vapor outlet 86, and a pressure-relief outlet 88. The discriminator screen 84 depends therefrom so that it is suspended in an interior space 90 of annular shield 80 when the top cover assembly 72 is mounted on the hollow base 70.

In use, fuel vapor introduced into separator 42 is swirled through swirl passage 82 causing liquid fuel (represented by broken line arrows in FIGS. 3 and 6) entrained in the fuel vapor to move downwardly toward the liquid fuel outlet 77 while the remaining lower density fuel vapor (represented by solid line arrows in FIGS. 3, 5, and 6) moves upwardly toward the fuel vapor outlet 86. The discriminator screen 84 intercepts the swirling fuel vapor so that some of the liquid fuel entrained in the vapor coalesces or otherwise agglomerates thereon to form liquid fuel droplets that once formed fall under gravity toward liquid fuel outlet 77. Fuel vapor outlet 86 is coupled to refuel control valve 44 by pipe 92 and pressure-relief outlet 88 is coupled directly to safety valve 48. In addition, liquid fuel outlet 77 is coupled to inner chamber 58 of the filler neck 14 to provide means for recovering separated liquid fuel by recirculation of same to the fuel tank 12 via filler neck 14.

Figure 4:
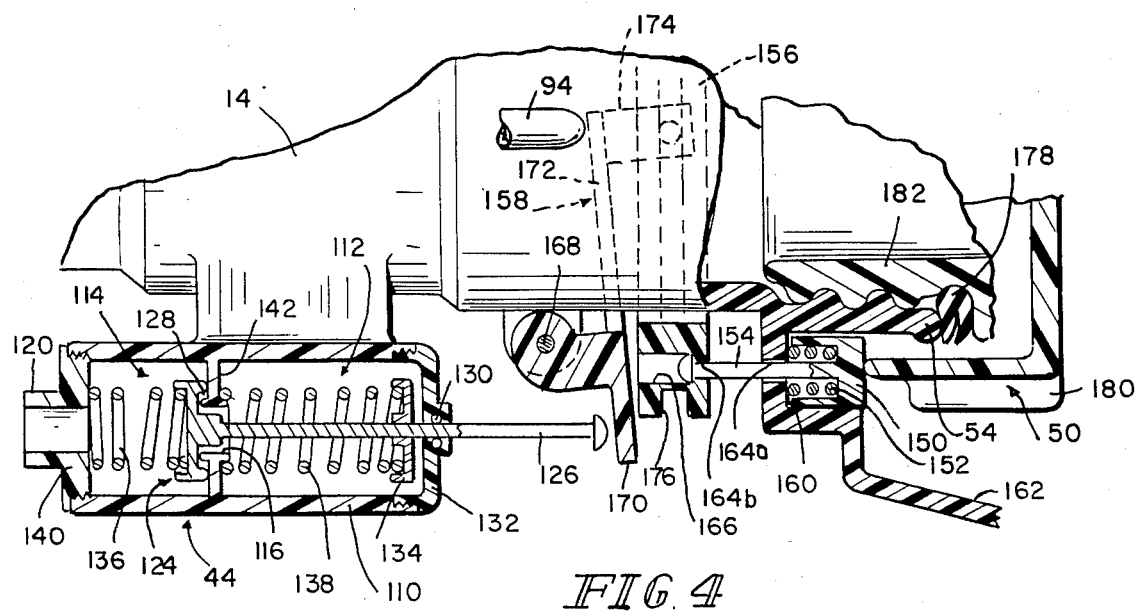
FIG. 4 is a longitudinal sectional view taken along lines 4—4 of FIG. 3 showing a fuel cap mounted on a fuel tank filler neck in a fully-tightened position during normal non-refueling activities.
Figure 5:
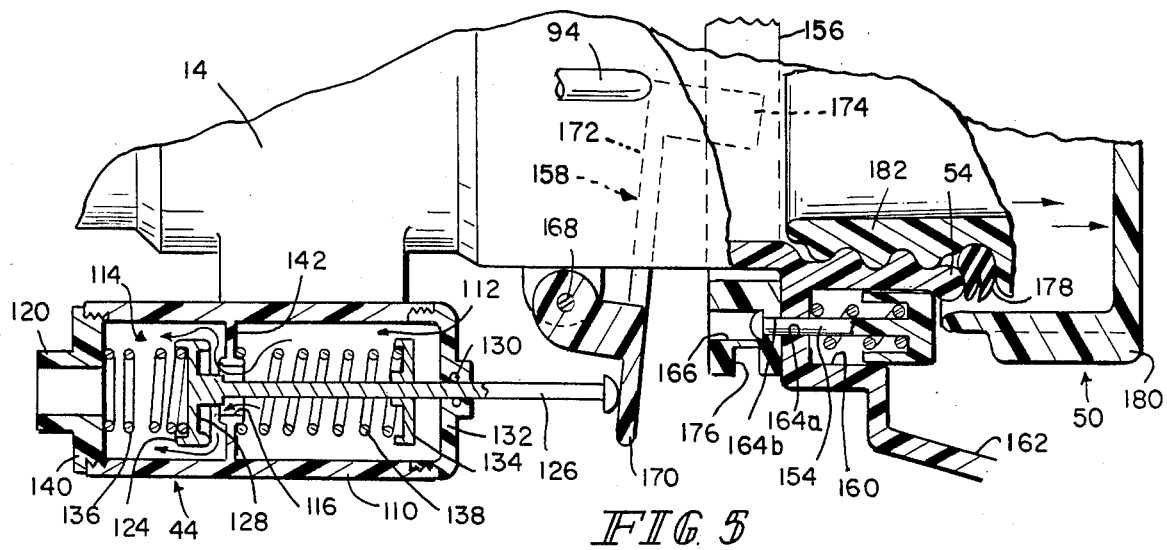
FIG. 5 is a view similar to the view in FIG. 4 showing the fuel cap in a slightly loosened position during an initial stage of fuel vapor recovery.

Refuel control valve 44 regulates the flow of fuel vapor discharged from separator 42 to the canister 26 so that such flow is permitted only during vehicle refueling activity. Referring to FIGS. 4 and 5, the refuel control valve 44 includes a valve housing 110 providing downstream chamber 112 coupled in fluid communication to an upstream chamber 114 by central aperture 116. As shown best in FIG. 3, the refuel control valve 44 also includes a fuel vapor inlet 118 coupled to the fuel vapor outlet 86 of separator 42 via pipe 92 and fuel vapor outlet 120 coupled to canister 24 via pipe 122.

A primary valve head 124 is provided in upstream chamber 114 for closing central aperture 116 during all period of non-refueling activity to prevent unwanted distribution of fuel vapor from separator 42 to the canister 26. Valve stem 126 extends in substantially spaced-apart parallel relation to filler neck 14 from a downstream face 128 of valve head 124 through a bearing support 130 provided in end wall 132 of valve housing 110 toward the filler neck mouth 54. A secondary valve head 134 is provided in downstream chamber 112 and rigidly attached to valve stem 126 for movement therewith.

The primary valve head 124 is normally loaded to its shut-off position closing aperture 116 by each of biasing springs 136, 138 as shown best in FIG. 4. Primary biasing spring 136 acts between fixed end wall 140 and movable primary valve head 124 while secondary biasing spring 138 acts between fixed central wall 142 and movable secondary valve head 134. It will be appreciated that such a dual-spring arrangement advantageously ensures substantially fail-safe operation of refueling control valve 44 in that the primary valve head 124 will remain in its normally closed shut-of position even if one of springs 136, 138 should fail.

Actuating linkage 46 provides one preferred means for actuating the refueling control valve 44 during a predetermined initial stage of each refueling activity. In the illustrated embodiment, a mechanical spring-biased linkage is provided for sensing when fuel cap 50 is loosened from its mounted position on the filler neck 14, which loosening is indicative of the beginning of a refueling activity cycle, and for then moving the primary valve head 124 in opposition to biasing springs 136, 138 to an aperture (116)-opening position. Once aperture 116 is opened, fuel vapors can flow therethrough from the vapor-liquid separator 42 to the canister 26 during refueling. It will be appreciated that various hydraulic, pneumatic, electrical, and mechanical sensory switching systems could form analogs of the preferred mechanical actuating linkage 46 illustrated in FIGS. 3-6 without departing from the present invention.

One important feature of the present invention is that the vapor recovery module 20 is activated automatically or at least remotely controlled to recover fuel vapor for later recombustion whenever the vehicle is ready for refueling. It is within the scope of the present invention to actuate said linkage means by a manner other than loosening of a fuel cap. For example, actuating linkage 46 could be coupled to a fuel door, fuel pump nozzle, control button, or other similar member to permit a refueling attendant to actuate the refueling control valve 44 in a variety of different ways at a preferred moment during each refueling activity cycle.

Referring to FIGS. 3-6, actuating linkage 46 includes an annular control pad 150, pad-biasing springs 152, control rods 154, control ring 156, and pivoting yoke lever 158. As shown best in FIGS. 4-6, control pad 150 is positioned in outwardly-facing annular groove 160 formed in refueling cavity wall 162 in a region surrounding the mouth 54 of the filler neck 14. A plurality of control rods 154 extend from control pad 150 through companion rod-receiving apertures 164a,b formed in the refueling cavity wall 162 and control ring 156, respectively, into engagement with annular groove 166 formed in control ring 156 as seen in FIGS. 4 and 5. A pad-biasing spring 152 surrounds each control rod 154 to bias the control pad 150 normally from the inactive position shown in FIG. 4 to the valve-actuating position shown in FIG. 5. Although spring 152 is shown in annular groove 160 in FIGS. 4 and 5, it is expected that such a spring could alternatively be positioned elsewhere, e.g., in contact with control ring 156 Yoke lever 158 is mounted for pivotal movement about a vertical pivot axis at pivot 168. In the illustrated embodiment best seen in FIGS. 1, 4, and 5, yoke lever 158 includes a central lever arm 170 for contacting a distal end of valve stem 126 and a pair of oppositely-extending outstretched lever arms 172 for engaging the control ring 156. In particular, as best seen in FIG. 6, projections 174 on lever arms 172 engage a radially-outwardly facing channel 176 formed on an outer edge of control ring 156 to interconnect lever arms 172 and control ring 156.

The safety valve 48 is illustrated in FIGS. 1, 3, and 5 and includes a normally closed poppet valve 194 and biasing means 196 for yieldably biasing the poppet valve 194 from an open venting position (not shown) to its normally closed position. The poppet valve 194 is moved against the yieldable biasing means 196 whenever the pressure in a vapor flow passage 16, 70, 76, 92, 110, and 122 coupling tee fuel tank 12, vapor-liquid separator 42, refuel control valve 44, and vapor treatment site 26 in fluid communication exceeds a predetermined threshold pressure level. In addition, the safety valve 48 is configured to issue a sonic warning to a refueling attendant during exhaustion to the atmosphere via pipe 94, outlet opening 198, and outer chamber 56 of the fuel vapor discharged from the vapor-liquid separator 42 via the open poppet valve 194. Thus, the safety valve 48 is designed to provide a bypass conduit around the sealed partition 40 to provide a means for discharging fuel vapor to the atmosphere during refueling in the event the refuel control valve 44, actuating linkage 46, or other component is disabled due to malfunction.

In operation, loosening of fuel cap 50 allows control pad 150 to be urged by spring 152, to the right of its position shown in FIG. 4 toward its valve-actuating position shown in FIG. 5. At the same time, control rods 154 pull control ring 156 also to the right causing yoke lever 158 to pivot in a clockwise direction about its pivot axis 168, pushing the distal end of valve stem 126 to the left of its position shown in FIG. 4, thereby causing valve heads 124, 134 to compress springs 136, 138, respectively. Such movement opens valve head 224 permitting fuel vapor to be conducted therethrough to the canister 26 in response to loosening of the fuel cap 50. It is envisioned that fuel cap 50 threadedly engages the filler neck 14 at its mouth 54 so that fuel cap 50 may be loosened simply by rotation. Seal 178 is provided between filler neck cap 14 and fuel cap 50 to seal outer chamber 56 at its outermost end 54 as shown best in FIGS. 4 and 5.

Fuel cap 50 provides suitable means for actuating control pad 150 to vent vapor through the refueling control valve assembly 44 without prematurely breaking the seal provided by seal 178. This seal-maintaining function could be accomplished in a number of different ways. Preferably, fuel cap 50 includes a lost-motion feature so that a control pad-activating grip portion 180 of fuel cap 50 is movable relative to an inner seal-maintaining portion 182 also of the cap 50 during the initial stages of every refueling activity. Thus, the refueling attendant can rotate grip portion 180 a sufficient amount, desirably about one-half of a full turn, to release the outwardly biased control pad 150 without rotating seal-maintaining portion 182, which release could result in prematurely breaking the seal provided by seal 178.

Figure 2:
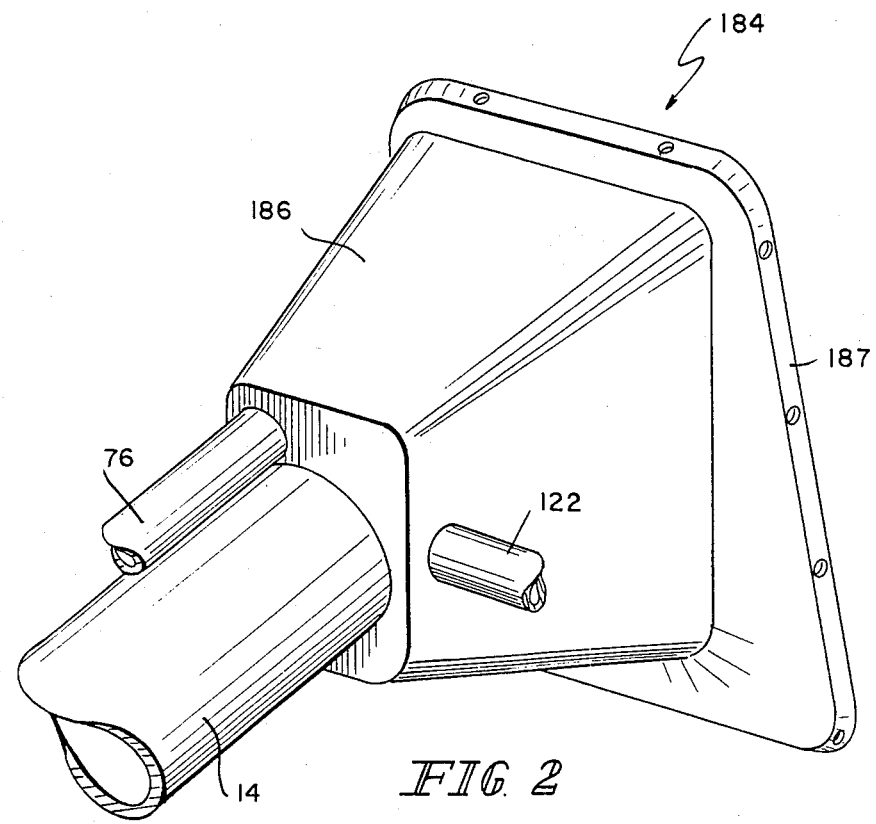
FIG. 2 is a perspective view of an impact shield for use in protecting a portion of the system of the present invention.

Referring to FIGS. 2 and 3, refueling module impact shield 184 is provided for mounting to interior plate 183 within the vehicle interior to protect exposed portions of vapor recovery module 20. The impact shield 184 includes a shield housing 186 provided with peripheral mounting flange 187. The impact shield 184 is formed to include apertures provided with fill, fill-limit, and canister connections and is constructed of a high impact nylon material or the like to protect sensitive components of vapor recovery module 20.

In another embodiment (not shown) of the system shown in FIG. 1, it is contemplated that roll-over valve module 22 be incorporated directly into the structure of the vapor recovery module 20. In one arrangement, this could be accomplished by coupling (not shown) in fluid communication the fuel vapor inlet port of roll-over valve 28 to fuel vapor outlet 86 of vapor-liquid separator 42 instead of being coupled in fluid communication to fuel tank vapor space 24 via vent valve opening 18. It will be appreciated that various components of the roll-over valve module 22 could be included, either individually or in combination, in various locations within the network of the vapor recovery module 20 without departing from the scope of the present invention.

Figure 7:
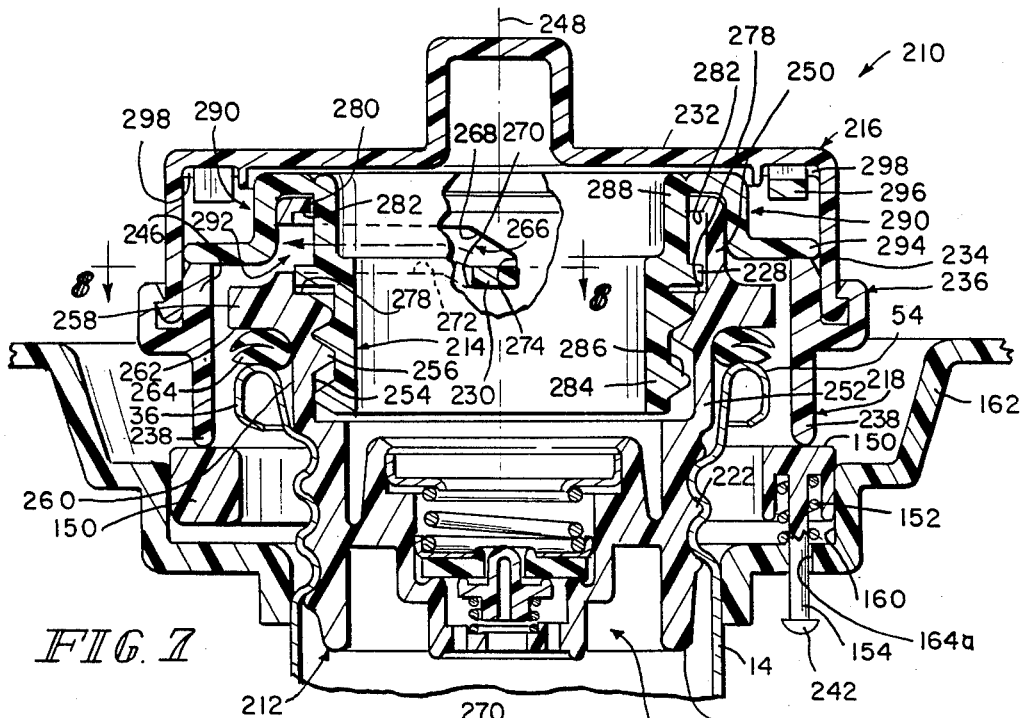
FIG. 7 is an axially sectional side elevation view of a threaded fuel cap constructed according to preferred embodiment of the present invention, with portions broken away to reveal a drive lug and a lug-receiving window, showing a first stage of operation in which a spring-loaded sensor is held in a disabled position by an actuator member on the cap.
Figure 8:
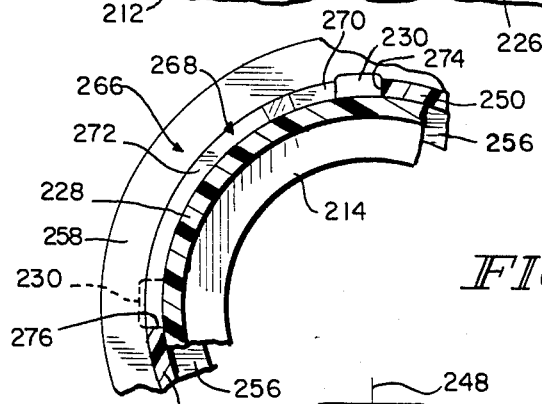
FIG. 8 is a fragmentary sectional view of a detail of the fuel cap of FIG. 7 taken generally along lines 8—8 thereof showing the drive lug in the lug-receiving window.
Figure 9:
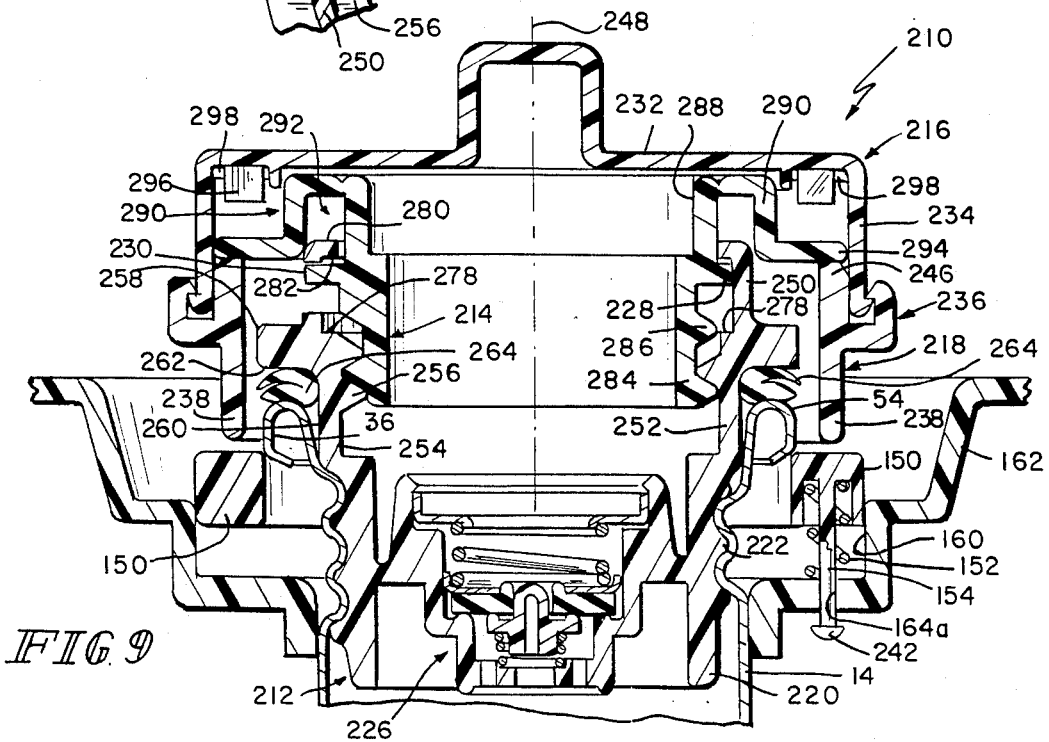
FIG. 9 is a view similar to FIG. 7 showing a second stage of operation in which the actuator member is moved to release and thereby activate the spring-loaded sensor without breaking a fuel vapor seal established between the fuel cap and the filler neck.

In an embodiment of fuel cap 50 illustrated in FIGS. 7–9, those elements referenced by numbers identical to those in FIGS. 1–6 perform the same or similar function. Referring to FIG. 7, a cap assembly 210 includes a closure member 212, a hub 214, a shell member 216, and an actuator member 218. The closure member 212 includes an axially inner portion 220 which is threaded as indicated at 222 to engage a threaded filler neck 14. A pressure-vacuum vent valve assembly 226 is positioned in the axially inner portion 220 of the closure member 212 to control the venting of pressure and vacuum which develop within a fuel tank (element 12 in FIG. 1) in a manner which is well known.

A control pad or sensor 150 is positioned in an outwardly-facing annular groove 160 formed in refueling cavity wall 162 in a region surrounding the mouth 54 of the filler neck 14. The control pad 150 is illustratively a ring which functions to sense removal of the cap assembly 210 from the filler neck 14 during an initial stage of a refueling activity. A plurality of control rods 154 extend from the control pad 150 through companion rod-receiving apertures 164a formed in the refueling cavity wall 162 and terminate at head 242. A pad-biasing spring 152 surrounds each control rod 154 to bias the control pad 150 normally from the disabled position shown in FIG. 7 to the actuating position shown in FIG. 9.

Control rod head 242 can be coupled to a suitable switch assembly (not shown in FIGS. 7–9) to activate a selected indicator or system when moved to the actuating position shown in FIG. 9. An illustrative switch assembly and system is shown in the embodiment of FIGS. 1–6.

It will be appreciated by those skilled in the art that systems other than the system disclosed in the embodiment of FIGS. 1–6 can be coupled for actuation to head 242 of control rod 154. Further, such systems can be configured to be actuated upon movement of control rod 154 to the position shown in FIG. 9 (as disclosed in the illustrative embodiment), or, in the alternative, upon movement of control rod 154 to the position shown in FIG. 7. For example, such other systems might comprise, without limitation, a pump-based fuel vapor recovery system, or some other automotive or non-automotive system unrelated to fuel vapor recovery such as an indicator or other signal means (not shown).

Referring to FIGS. 7 and 9, closure member 212 also includes an axially outer portion 250 and a central shank portion 252 interconnecting the axially inner and outer portions 220, 25. An inside wall 254 of shank 252 is threaded as indicated at 256 to receive hub 214. A shank flange 258 extends from an outside wall 260 of shank portion 252 in a radially outward direction to provide an annular axially-inwardly facing surface 262. An O-ring gasket seal 264 is sealingly compressed between surface 262 of the shank flange 258 and the conventional peripherally and radially outwardly-extending annular lip provided by the filler neck mouth 54 when the cap assembly 210 is in its closed position illustrated in FIG. 7. In this position, fuel vapors present in filler neck 14 are generally unable to escape to the atmosphere unless permitted to do so by the pressure-vacuum vent valve assembly 226.

A lug-receiving window 266 is provided in the axially outer portion 250 of the closure member 212 as best seen in FIGS. 7 and 8. The window 266 is defined by a boundary rim 268 comprising a first bottom ledge 270, a relatively higher second bottom ledge 272, a first lug-engaging wall 274, and an opposite second lug-engaging wall 276. The closure member 212 also includes a lower annular, axially outwardly-facing bearing surface 278 at the axially outer edge of threads 256 and an annular lip 280 at the distal end of the axially outer portion 250. The annular lip 280 provides an upper axially inwardly-facing annular bearing surface 282 positioned to confront the lower annular bearing surface 278.

The hub 214 includes an axially inner portion 284, threaded as indicated at 286 to engage the threaded inside wall 254 of the closure member 212 and an axially outer portion 288. A hat-shaped member 290 is attached to the axially outer portion 288 of the hub 214 as shown in FIGS. 7 and 9 to form a chamber 292 for receiving the axially outer portion 250 of the closure member 212 during axially inward movement of the hub 214 within the closure member 212.

The hat-shaped member 290 includes a radially outwardly-extending hub flange 294. The hub flange 294 includes axially outwardly-extending pawls 296 for engaging a drive surface 298 on the underside of the shell member 216 to provide a conventional torque-limited connection between the hubs 214 and the shell member 216 in a cap-advancing direction. Reference is hereby made to U.S. Pat. No. 4,091,955 to Sloan, Sr. for a description of a suitable torque override drive system. It will be understood that it is within the scope of the present invention to provide cap 210 with a permanent drive means (not shown) instead of the illustrated torque override drive system.

The hub 214 further includes a radially outwardly-extending annular skirt 228 projecting from a central portion of its exterior surface as shown in FIGS. 7–9. A drive lug 230 extends from the peripheral edge of the skirt 228 in a radially outward direction into the window 266 of the closure member 212. Referring particularly to FIG. 8, the single drive lug 230 is movable within window 266 from the solid line "rest" position to the dotted line "driving" position upon rotation of the hub 214 within the closure member 212 in response to rotation of the shell member 216 in a cap removal direction.

The shell member 216 includes a top portion 232 and a side portion 234 depending therefrom to provide a hand grip. The actuator member 218 includes a coupling portion 236 coupled to the side portion 234 of the shell member 216 and an actuating portion 238 depending therefrom to engage the control pad 150 during movement of the shell member 216 toward the closure member 212. The coupling portion 236 includes an inner sleeve 246 for supporting hub flange 294 so as to trap the hub 214 between the shell member 216 and actuating member 218 in rotatable relation.

In operation, cap assembly 210 activates sensor 150 during removal from filler neck 14 prior to breaking the vapor seal established between closure member 212 and filler neck 14. In a preferred embodiment, sensor 150 actuates a fuel vapor recovery system for venting fuel vapors within the sealed filler neck to a charcoal canister or other recovery site.

The fuel cap 210 is manually removed from the filler neck 14 by gripping and rotating the shell member 216. During a first stage, interengagement of the shell member 216 with the hub 214 via a connection established by pawls 296 and drive surface 298 causes the hub 214 to rotate in relation to the closure member 212 as long as the torque applied to shell member 216 is less than a predetermined amount. The rotating shell member 216 and hub 214 assembly cooperates to move the attached actuator member 218 in an axially-outward direction to its sensor-activating position shown in FIG. 9. Such movement permits the loading springs 152 to urge the otherwise restrained sensor 150 in an axially-outward direction toward its actuating position also shown in FIG. 9. The closure member 212 is not rotated in response to rotation of the shell member 216 during this first stage as a result of the lost motion connection established therebetween.

Continued manual rotation of the shell member 216 and the hub 214 assembly in a cap-removal direction during a second stage causes the hub drive lug 230 to rotate about a longitudinal axis 248 of the hub 214 and move within the side wall window 266 to a point shown in FIG. 9 engaging wall 276 provided by the boundary rim 268 of the window 266. A driving connection is now established between the hub 214 and shell member 216 in lieu of the lost motion connection. The closure member 212 rotates in relation to the filler neck 14 in response to continued rotation of the shell member 216 and the hub 214 assembly due to interengagement of the hub drive lug 230 and wall 276. Such rotation acts to move the exterior flange 258 of the closure member 212 in an axially-outward direction due to threaded engagement of the hub 214 and closure member 212. Thus, flange 258 moves away from the annular lip 54 defining the filler neck mouth 14 to break the fuel vapor seal established therebetween by the O-ring 264. Advantageously, the closure member 212 is not rotated relative to the filler neck 14 through an angle sufficient to break the seal provided by O-ring 264 until the actuator member 118 has been moved to the sensor-activating position shown in FIG. 9.

Further manual rotation of the closure member 212 in the cap-removal direction past such a seal-breaking position will eventually result in removal of the fuel cap assembly 210 from the filler neck 14. Of course, such removal permits a fuel-dispensing nozzle to be inserted into the filler neck 14 to complete refueling of the vehicle. Advantageously, substantially all of the fuel vapor in the filler neck will already have been vented to a remote fuel vapor treatment site and recovered before the fuel vapor seal is broken due to activation of the sensor, resulting in actuation of an accompanying fuel vapor recovery system or the like. Such venting prevents discharge of polluting fuel vapors into the atmosphere during vehicle refueling.

Although the invention has been described in detail with reference to certain preferred embodiments, variations and modifications exist within the scope and spirit of the invention as described and as defined in the following claims.

What is claimed is:

1. A two-stage fuel cap for use in a filler neck of a vehicle fuel system, the system including a sensor positioned in close proximity to the filler neck, the cap comprising closure means rotatably engaging the filler neck for closing the filler neck, the closure means including seal means for establishing a seal with the filler neck to prevent the escape of fuel vapors in the filler neck to the atmosphere, and shell means for providing a hand grip, the shell means including first stage means for activating the sensor in response to rotation of the shell means through a first predetermined angle relative to the filler neck prior to breaking the seal established by the seal means and second stage means for subsequently breaking the seal established by the seal means in response to continued rotation of the shell means through a second predetermined angle relative to the filler neck.

2. The cap of claim 1, wherein the first stage means includes a hub rotatably mounted in the closure means, drive means for interconnecting the hand grip and the hub so that the hub rotates in response to rotation of the hand grip, and an actuator member coupled to the hub for movement therewith between an inactive position and a sensor-activating position, the actuator member being moved toward its sensor-activating position in response to rotation of the hub through the first predetermined angle.

3. The cap of claim 2, wherein a second stage means includes a lug on the hub, and the closure means includes a side wall formed to include an inner wall defining a lug-receiving opening in the side wall, the lug being movable in the opening to establish a lost motion connection between the shell means and the closure means during operation of the first stage means so as to delay breaking the seal established by the seal means until after the sensor has been moved to its sensor-activating position, the lug engaging a selected portion of the inner wall upon rotation of the hub through the first predetermined angle to establish a driving connection between the hub and the closure means, the lug acting to apply a rotation-inducing torque to the closure means in response to further rotation of the hub through the second predetermined angle so as to rotate the closure means toward a removal position.

4. A system for activating a sensor during an initial stage of a vehicle refueling activity, the system comprising a fuel tank filler neck having a mouth, the sensor being positioned in close proximity to the filler neck, and a fuel cap including closure means rotatably engaging the filler neck for closing the mouth, seal means for providing a seal between the closure means and the filler neck, shell means for providing a hand grip, hub means interconnecting the closure means and shell means for applying a torque to the closure means after a predetermined amount of movement of the shell means relative to the filler neck so that a lost motion connection is established between the closure means and the shell means, and an actuator member movable between an inactive position and a sensor-activating position, the lost motion of the hub means acting to move the actuator member to its sensor-activating position before rotating the closure means relative to the filler neck sufficiently to break the seal provided by the seal means so that fuel vapors in the filler neck are unable to escape therefrom through the mouth until at least the sensor has been activated.

5. The system of claim 4, wherein the actuator member is coupled to at least one of the hub means and the shell means for movement therewith.

6. The system of claim 4, wherein the hub means includes means for threadedly engaging the closure means so that lost motion occurs during rotation of the hub means relative to the closure means.

7. The system of claim 6, wherein the actuator member is coupled to at least one of the hub means and the shell means for movement therewith, and the hub means includes drive means for engaging the shell means to establish a driving connection between the hub means and the shell means, the hub means and shell means rotating relative to the closure means due to lost motion of the hub means and simultaneously moving in an axially outward direction due to the threaded engagement of the hub means and the closure means in response to rotation of the shell means relative to the filler neck, thereby moving the actuator member from its inactive position to its sensor-activating position.

8. The system of claim 4, wherein the actuator member includes a coupling portion coupled to the shell means and an actuating portion depending therefrom to engage the sensor during movement of shell means toward the closure means, the coupling portion including retainer means for engaging the hub means to trap the hub means between the shell means and the actuator member in rotatable relation to each of the shell means and the actuator member.

9. The system of claim 8, further comprising
first stage means, establishing a driving connection between the hub means and the shell means, for rotating the hub means relative to the closure means in response to rotation of the shell means relative to the filler neck, the threaded engagement of the hub means and closure means acting to move the rotating hub means in an axially outward direction relative to the closure means due to the lost motion connection established therebetween, the actuator member being moved to its sensor-activating position in response to rotation of the hub means through a predetermined angle so that the actuating portion disengages the sensor, and
second stage means, establishing a driving connection between the hub means and the closure means to supplant the lost motion connection, for rotating the closure means relative to the filler neck in response to continued rotation of the hub means past the predetermined angle so that rotation of the closure means relative to the filler neck through an angle sufficient to break the seal provided by the seal means is delayed until the actuator member has been moved to its sensor-activating position.

10. The system of claim 4, wherein the filler neck includes an annular lip defining the mouth, the closure means includes an exterior wall having a radially outwardly-extending flange, and the seal means is a resilient O-ring trapped in sealing relation between the filler neck lip and the radially outwardly-extending flange.

11. The system of claim 4, wherein the closure means includes an axially inner portion for engaging the filler neck and an axially outer portion, and the hub means rotatably engages the axially outer portion of the closure means and includes drive means for rotating the hub means relative to the closure means in response to rotation of the shell means to establish a driving connection between the axially outer portion of the closure means and the shell means.

12. The system of claim 11, wherein the drive means includes one of
torque releasable means for selectively establishing the driving connection between the hub means and the shell means to cause the hub means to rotate relative to the closure means in response to application of a rotation-inducing torque that is less than a predetermined threshold amount, and
permanent means for providing a substantially permanent driving connection between the hub means and the shell means to cause the hub means always to rotate relative to the closure means in response to rotation of the shell means.

13. The system of claim 4, wherein the shell means includes a top grip portion and a side wall depending therefrom, the actuator member includes a retaining surface and interlock means for lockably engaging the side wall of the shell means to trap the hub means between the top grip portion of the shell means and the retaining surface of the actuator member.

14. A system for activating a sensor during an initial stage of vehicle refueling activity, the system comprising
a fuel tank filler neck having a mouth, the sensor being positioned in close proximity to the filler neck,
a fuel cap including closure means for closing the mouth, the closure means including an axially inner portion for engaging the filler neck and an axially outer portion, seal means for providing a seal between the closure means and the filler neck, shell means for providing a hand grip, an actuator member movable between an inactive position and a sensor-activating position, hub means interconnecting the closure means and shell means for sequentially moving the actuator member to its sensor activating position after a predetermined amount of movement of the shell means relative to the filler neck and then moving the closure means relative to the filler neck to break the seal established by the seal means after a further predetermined amount of movement of the shell means relative to the filler neck so that a lost motion connection is established between the closure means and the shell means, the closure means being withdrawn from the filler neck by the hub means only after the actuator member has been moved to its sensor-activating position by the hub means as a result of the lost motion connection.

15. The system of claim 14, wherein the filler neck includes an annular lip defining the mouth, the axially outer portion of the closure means is defined by an annular side wall including an interior wall threaded to receive the hub means therein and an exterior wall having a radially outwardly-extending flange, and the seal means is a resilient O-ring trapped in sealing relation between the filler neck lip and the radially outwardly-extending flange.

16. The system of claim 14, wherein the actuator member is coupled to the shell means, and further comprising cam means for interengaging the hub means and the axially outer portion of the closure means to move the hub means away from the filler neck in an axially outward direction in response to rotation of the hub means relative to the closure means, the hub means and shell means cooperating to move the actuator member from its inactive position toward its sensor-activating position during movement of the hub means in the axially outward direction.

17. The system of claim 14, wherein the hub means includes a hub that is rotatable relative to the closure means between a first position corresponding to the inactive position of the actuator member and a second position corresponding to the sensor-activating position of the actuator member, first drive means for rotating the hub relative to the closure means in response to rotation of the shell means to establish a driving connection between the axially outer portion of the closure means and the shell means, and second drive means for establishing a driving connection between the hub and the closure means upon rotation of the hub to its first position so that continued rotation of the hub via the first drive means acts to impart a rotation-inducing force t the closure means to rotate the closure means toward a filler neck-disengaging position and break the seal provided by the seal means.

18. The system of claim 17, wherein the closure means further includes stop means for limiting rotation of the hub relative to the closure means in a direction away from the first position and past the second position substantially to prevent disengagement of the hub and the axially outer portion of the closure means during rotation of the closure means toward its filler neck-disengaging position.

19. The system of claim 17, wherein the axially outer portion of the closure means includes a threaded interior wall defining a hub-receiving chamber, the hub includes a shank portion threaded lo engage the threaded interior wall of the closure means, and the hub is moved away from the filler neck in an axially outward direction during rotation of the hub from its first position toward its second position due to camming action provided by the threaded interengagement of the hub and the closure means.

20. The system of claim 19, wherein the actuator member is coupled to the shell means, and the hub and shell means cooperate to move the actuator member from its inactive position toward its sensor-activating position during movement of the hub away from the filler neck in the axially outward direction.

21. The system of claim 17, wherein the axially outer portion of the closure means is formed to include a lug-receiving window bounded by a rim, the rim including a first side wall, and the hub includes a drive lug extending in a radially outward direction into the window of the closure means, the drive lug engaging the first side wall of the window rim in response to rotation of the hub to its first position to establish the driving connection between the hub and the closure means.

22. The system of claim 21, wherein the rim includes a second side wall situated in spaced-apart relation to the first side wall, the drive lug engaging the second side wall of the window rim in response to rotation of the hub to its second position to block further rotation of the hub relative to the closure means, thereby preventing disengagement of the hub and the axially outer portion of the closure means.

* * * * *

UNITED STATES PATENT AND TRADEMARK OFFICE
CERTIFICATE OF CORRECTION

PATENT NO. : 4,795,050

DATED : January 3, 1989

INVENTOR(S) : Dwight Smith and Robert S. Harris

It is certified that error appears in the above-identified patent and that said Letters Patent is hereby corrected as shown below:

At column 2, line 33, please delete "tee" and insert therefor --the--;

At column 2, line 39, please delete "add" and insert therefor --and--;

At column 7, line 60, after "156" please insert --.-- (period);

At column 8, line 11, please delete "tee" and insert therefor --the--;

At column 15, line 20, please delete "t" and insert therefor --to--; and

At column 16, line 2, please delete "lo" and insert therefor --to--.

Signed and Sealed this

Thirtieth Day of May, 1989

Attest:

DONALD J. QUIGG

Attesting Officer

Commissioner of Patents and Trademarks